United States Patent [19]

Marcora et al.

[11] Patent Number: 4,892,669

[45] Date of Patent: Jan. 9, 1990

[54] COMPOSITION BASED ON POLYTETRAFLUOROETHYLENE SUITED FOR OBTAINING A SELF-LUBRICATING LAYER ON POROUS BRONZE BEARINGS

[75] Inventors: Giovanni Marcora, Magnago; Federico Cataldo, Cagliate, both of Italy

[73] Assignee: Ausimont S.p.A., Italy

[21] Appl. No.: 120,663

[22] Filed: Nov. 16, 1987

[30] Foreign Application Priority Data

Nov. 21, 1986 [IT] Italy .................................. 22419 A/86

[51] Int. Cl.$^4$ ................. C10M 107/38; C10M 125/00
[52] U.S. Cl. ......................................... 252/30; 252/25; 252/28; 252/29; 252/49.7; 252/51.5 A; 252/52 A; 252/58
[58] Field of Search .............................. 252/29, 30, 58

[56] References Cited

U.S. PATENT DOCUMENTS

| | | | |
|---|---|---|---|
| 2,964,476 | 12/1960 | Coad | 252/30 |
| 3,518,190 | 6/1970 | Groszek | 252/29 |
| 3,639,237 | 2/1972 | Curtis | 252/29 |
| 4,201,809 | 5/1980 | Ogawa et al. | 252/25 |
| 4,284,519 | 8/1981 | Reick | 252/29 |
| 4,329,238 | 5/1982 | Mitrojanova et al. | 252/30 |
| 4,396,514 | 8/1983 | Randisi | 252/30 |
| 4,532,054 | 6/1985 | Johnson | 252/29 |
| 4,715,972 | 12/1987 | Pacholke | 252/30 |

FOREIGN PATENT DOCUMENTS 432174 11/1974 U.S.S.R. ............................... 252/30

Primary Examiner—William R. Dixon, Jr.
Assistant Examiner—E McAvoy
Attorney, Agent, or Firm—Stevens, Davis, Miller & Mosher

[57] ABSTRACT

A composition based on PTFE, in the form of a paste, obtained by mixing together a PTFE powder, with mineral fillers, selected from PbO, Pb powder, aluiminum silicates, graphite, $MoS_2$, a resin of high adhesive properties, in particular an epxoy resin; solvents with good wetting properties for the solid ingredients and vaseline to impart to the paste the suitable degree of viscosity, said paste being applicable in a very thin layer to porous bronze bearings or supports, and suited for forming a self-lubricating layer, after a thermal treatment of the said PTFE on said bearings.

5 Claims, No Drawings

COMPOSITION BASED ON POLYTETRAFLUOROETHYLENE SUITED FOR OBTAINING A SELF-LUBRICATING LAYER ON POROUS BRONZE BEARINGS

DESCRIPTION OF THE INVENTION

Object of the present invention is that of providing a PTFE-based composition, in the form of a paste, suited for obtaining a thin self-lubricating layer on a porous bronze bearing. The composite material thus obtained is used in the production of sliding-friction main bearings working in the absence of lubricating greases or oils. By this method there may be obtained bushings, flanged sleeves, thrust bearings, sliding strips and slippage surfaces in general, particularly used in applications where the maintenance is difficult and where there is not foreseen any presence of lubricants.

Moreover they may work in corrosive surroundings, within a wide temperature range comprised between −20° and 260° C. and they are of small size.

There are known composite materials useful for the manufacture of supporting sliding friction bearings, working in the dry and consisting of:

a metal support, more particularly of steel;

a thin porous bronze layer firmy fixed to the metal support, more particularly obtained by a sintering process;

a layer, coating the porous bronze and firmly anchored to the same, having a low friction coefficient, self-lubricating and consisting of a resin with a binding function, said resin being loaded with suitable materials.

In U.S. Pat. No. 4,394,275 are described composite materials of the above described type, in which the resinous coating layer consists of polyvinylidenefluoride loaded with metal lead in a powdery form and possibly with a minor quantity (max. 30% by weight) of PTFE.

Coatings of this kind are suited only when the working temperature of the manufactured article is maintained within rather low values; in fact, at the melting temperature of the employed vinylidenefluoride, there would occur a drastic reduction of the resistance to wear.

In European Pat. No. 163,937 there is described the preparation in which there is used a PTFE paste constituted of an aqueous dispersion of the polymer and of the suitable mineral charges: the presence of water requires a very complex application prcess for the paste by the use of auxiliary filtering paper sheets, a polyester fabric for the partial elimination of the water before the sintering.

The PTFE-based composition, according to this invention is suited for supplying a coating layer displaying excellent self-lubricating properties as well as an excellent resistance to the high operational temperatures for the manufactured article. Said composition is prepared in the form of a paste suited for being applied by means of automatic mechanical systems, such as spreading rollers and the like, onto the sinterized bronze layer, and then being subjected to a thermal (heat) treatment under conventional temperature conditions, to obtain the sintering of the PFTE.

The composition according to this invention does not contain water but comprises the following essential ingredients:

(a) polytetrafluoroethylene in the form of a dry powder consisting of particles with a granulometric size range between 1 and 8 microns, but preferably below 4 micron, said granulometry being also achevable by rduction of the granules of the starting PTFE during the processing of the mixture in a roller mill. The PTFE must, moreover, have a molecular weight between 300,000 and 500,000, and must display a meltflow index between 0.1 and 0.3, measured at 380° C., according to ATM D-1238 rule, with P=22 kg, a nozzle with an inside diameter of 1 mm and a height of 8 mm. The quantity of PTFE in the end composition amounts to 30%–60% by weight.

PTFE used in the present invention is preferably obtained by dispersion of emulsion by cocoagulation.

(b) mineral charges with good selflubricating properties, selected from: $MoS_2$, graphite, PbO, Pb metal powder, aluminum silicate. The granulometry of the filling substances must preferably be comprised within the interval of 4–5 micron.

The global quantity of the charges or fillers in the end composition must be comprised between 10% and 25% by weight. The charges must also confer to the coating composition obtained a good thermal conductivity, so as to easily disperse the friction heat developed during the operation of the support. To this purpose it is advisable that the graphite to be present in a quantity comprised between 1% and 5% by weight;

(c) a resin with the function of ensuring a high adhesion of the coating layer covering the porous bronze substrate, combined with a good flexibility, also in view of a possible mechanical bending of the bonded (laminated) composite material during the production of manufactured articles. The resin must, moreover, resist the high temperature required by the thermal heat treatment in the sintering of the PTFE.

Resins suited for the purpose are for example, epoxy-, silicon-, and polyamide resins. The quantity of resin should be kept within the necessary limits, which in general are between 2% and 8%, but preferably 3–5% by weight on the total weight. The resin is introduced in the formula suitably diluted or dissolved in a volatile solvent in order to easily carry out the evaporation before the thermal sintering treatment, preferably at the boiling point between 75° and 120° C.;

(d) a liquid having a good wetting power with regard to the PTFE and also to the charges or fillers of the class of chlorinated hydrocarbon solvents, sufficiently volatile (boiling point between 50° and 150° C.). More particularly, for this purpose are suited perchloroethylene and methylene chloride. The quantity of liquid is in general between 10% and 20% by weight, and is determined in function of the viscosity desired for the paste.

(e) a paraffin hydrocarbon having a viscosity between 10 and 20 centistokes at 40° C. The quantity of this substance is adjusted with reference to the viscosity desired for the final paste, and in general is between 10% and 50%.

The mixing of the above indicated ingredients is carried out on suitable equipment of the conventional type. One starts with the mixing together of the powdery materials (PTFE and the mineral charges or fillers), whereafter there is admixed to it resin (c), dissolved in a solvent, the wetting liquid (d) and the paraffinic hydrocarbon (e). The thorough mixing together of the ingredients may be more particularly carried out on a roller mill. This paste is then applied, by means of a mechanical spreading system, for instance by means of a roller spreading device, on the porous bronze substrate supported by the metal sheet (in general made of steel). Thereupon follows a preliminary thermal treatment in order to eliminate the volatile components, followed by a thermal treatment at high temperatures in order to achieve the sintering of the PTFE, according to conventional operational procedures.

Thus, there is obtained a covering layer based on filled PTFE, perfectly anchored to the porous bronze layer, and having an excellent resistance to wear, excellent self-lubricating properties, capable of resisting to high operational temperatures of the sliding-friction type support. The PTFE-based covering layer, in general, has a suitable thickness of 25-30 micron.

The composite stratified material thus obtained may subsequently be machined and then subjected to bending, molding, cutting, in order to obtain finished manufactured articles such as bushings, slideways and guide shoes, etc.

It has been remarked that the flexibility and mechanical resistance of the PTFE-based layer is better when it is applied in more layers, that is, a first layer of 3-5 microns, the subsequent layers with a thickness of 10-15 microns, up to the final thickness.

In the following there is described, for purely illustrative purposes, the preperation of the paste according to this invention, and its application onto the metal substrate of steel/porous bronze.

EXAMPLE

With the hereunder following ingredients there was prepared a formulation:

| | |
|---|---|
| PTFE type L 206 | 40.2 parts by weight |
| MoS$_2$ | 1.7 parts by weight |
| PbO | 11.0 parts by weight |
| Graphite EK/83 | 1.7 parts by weight |
| Epoxy resin (Araldite GT/7071) | 3.4 parts by weight |
| Methylethylketone | 8.0 parts by weight |
| Perchloroethylene | 11.0 parts by weight |
| Vaseline | 23.0 parts by weight |
| | 100.0 parts by weight |

The powdery products, that is, the first four ingredients, were mixed together in the dry state. Thereupon there was first admixed the epoxy resin dissolved in methyleneketone and then the perchloroethylene, while continuing the mixing through until the added perchloroethylene had wetted all the ingredients. At last there was added the vaseline, thereby obtaining a paste with the desired consistency.

The thus obtained paste was thereupon passed through a tricylindrical refiner for its grinding and homogenization, this operation being repeated at least a minimum further two times.

Thereby was obtained a paste ready for use, with spreading characteristics suited for the coating of the porous support. The viscosity of the thus obtained paste amounted to 110 Cp: it may however be adjusted by adding vaseline oil with reference to the technology adopted for the application to the substrate.

By spreading, there was first applied a layer of about 3-5 micron thickness, and then there was added successive layers of 10-15 micron thickness each, until reaching a total thickness of 25-30 microns.

In this way there were avoided flow as in the sintering, due to the critical thickness of the formulate.

The sintering on a laboratory scale (30×70 mm laminations) was carried out at 400° C. for 7 minutes, in a static oven. The test pieces were subjected to wear-tests and to a determination of the friction coefficient. There were found excellent values.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What we claim is:

1. A PTFE-based composition suited for forming a covering layer with self-lubricating properties, to be applied on a porous bronze substrate, formed following a thermal sintering treatment, characterized in that it consists of the following ingredients, indicated in parts-by-weight per 100 parts of mixture:
   (a) PTFE in the form of a dry powder, with a granulometric distribution of between $1\mu$ and $8\mu$, a molecular weight from 300,000 to 500,000 and a melt-flow index of 0.1-0.3, measured at 350° C. according to ASTM D-1238, in a quantity between 30 to 60 parts by weight (p.b.w.);
   (b) inorganic component selected from: MoS$_2$, PbO, powdery metal Pb-graphite and aluminum silicates with a granulometry of from 4 to 5 microns, in a quantity of between 10-25 parts by weight;
   (c) an adhesive resin, selected from epoxy-, silicon-, and polyamidic resins, in a quantity between 2 and 8 p.b.w.;
   (d) a chlorinated hydrocarbon solvent with a good wetting power for PTFE and the inorganic component having a boiling point between 50° and 150° C., in a quantity between 10 and 20 p.b.w.;
   (e) alliphatic paraffinic hydrocarbon having a viscosity between 10 and 20 centistokes at 40° C. in a quantity between 10 and 50 p.b.w.;

2. The composition according to claim 1, wherein the adhesive resin contains graphite in a quantity of from 1 to 5 p.b.w. of the composition.

3. The Composition according to claim 1, wherein the adhesive resin is an epoxy resin, used in quantities of from 3 to 5 p.b.w.

4. The Composition according to claim 1, wherein the solvent with wetting properties is chosen from perchloroethylene and methylene chloride.

5. The Composition according to claim 1, wherein as a paraffinic hydrocarbon is used a vaseline having a viscosity of 15 centistokes at 40° C.

* * * * *